United States Patent
Whitten et al.

(10) Patent No.: US 7,678,176 B2
(45) Date of Patent: Mar. 16, 2010

(54) METHOD AND APPARATUS FOR CHARGING HOT DIRECT REDUCED IRON FROM HOT TRANSPORT VESSELS INTO A MELTER OR FINISHER

(75) Inventors: Gilbert V. Whitten, Mooresville, NC (US); James M. McClelland, Cornelius, NC (US); Stephen C. Montague, Midland, NC (US); Brian W. Voelker, Concord, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 189 days.

(21) Appl. No.: 11/823,959

(22) Filed: Jun. 29, 2007

(65) Prior Publication Data

US 2008/0000327 A1   Jan. 3, 2008

Related U.S. Application Data

(60) Provisional application No. 60/818,211, filed on Jun. 30, 2006.

(51) Int. Cl.
| | |
|---|---|
| C22B 5/20 | (2006.01) |
| C21C 1/04 | (2006.01) |
| C21C 5/30 | (2006.01) |
| C22B 21/00 | (2006.01) |

(52) U.S. Cl. .................... 75/414; 75/387; 266/200
(58) Field of Classification Search ......... 266/200; 75/387, 414
See application file for complete search history.

(56) References Cited

U.S. PATENT DOCUMENTS

| | | | | | |
|---|---|---|---|---|---|
| 4,612,043 | A | * | 9/1986 | Gray et al. ............ | 75/509 |
| 4,632,700 | A | * | 12/1986 | Bebber et al. .......... | 75/10.19 |
| 4,931,090 | A | * | 6/1990 | Bottinelli et al. ....... | 75/10.16 |
| 6,214,086 | B1 | * | 4/2001 | Montague et al. ...... | 75/490 |
| 6,241,086 | B1 | * | 6/2001 | Bergh et al. ........... | 206/308.1 |
| 6,428,763 | B1 | * | 8/2002 | Stephens et al. ....... | 423/439 |
| 2004/0173284 | A1 | * | 9/2004 | Rosen ................... | 141/83 |

* cited by examiner

*Primary Examiner*—Jerry Lorengo
*Assistant Examiner*—Eli Mekhlin
(74) *Attorney, Agent, or Firm*—Clements Bernard PLLC; Christopher L. Bernard; Seth L. Hudson

(57) ABSTRACT

The present invention provides a method and apparatus for charging hot direct reduced iron (HDRI) from hot transport vessels (HTVs) into a melter or finisher. In general, the apparatus includes a charging stand including a plurality of bays for receiving and supporting a plurality of HTVs. Each HTV includes at least an outlet port. This outlet port is configured to engage an inlet port of one of the plurality of bays of the charging stand via a telescoping seal that provides a substantially air-tight seal. A feed device is provided that moves the HDRI disposed within the HTVs from the outlet port/inlet port interface to a melter or finisher, such as an electric arc furnace (EAF) or the like. The charging stand also includes one or more load cells operable for weighing the HTVs and the HDRI disposed therein, such that a computer or other logic may be used to control the feed rate of the HDRI charged into the melter or finisher.

5 Claims, 3 Drawing Sheets

METHOD AND APPARATUS FOR CHARGING HOT DIRECT REDUCED IRON FROM HOT TRANSPORT VESSELS INTO A MELTER OR FINISHER

CROSS-REFERENCE TO RELATED APPLICATION(S)

The present non-provisional patent application claims the benefit of priority of U.S. Provisional Patent Application No. 60/818,211, filed on Jun. 30, 2006, and entitled "Method and Apparatus for Charging Hot Direct Reduced Iron From Hot Transport Vessels Into a Melter or Finisher," the contents of which are incorporated in full by reference herein.

FIELD OF THE INVENTION

The present invention relates generally to a method and apparatus for handling pellet, lump, and/or briquette charge materials for use in the steelmaking industry, for example. More specifically, the present invention relates to a method and apparatus for charging hot direct reduced iron (HDRI) from hot transport vessels into a melter or finisher.

BACKGROUND OF THE INVENTION

Direct reduced iron (DRI), and specifically HDRI—which is still hot from the metallization process, is used as a charge material in the making of steel. Many direct reduction (DR) plants are located in large steelmaking complexes in which HDRI is used on site in a nearby melter or finisher, such as an electric arc furnace (EAF) or the like. The use of HDRI, at a temperature greater than the ambient temperature, is preferable as compared to the use of DRI, at a temperature equal to or less than the ambient temperature, because the sensible heat of HDRI obviates the need to add additional energy, such as electrical energy in the case of an EAF, at the melter or finisher. In addition, HDRI has a lower moisture content than DRI, which is advantageous. When melting or finishing HDRI as compared to DRI, energy consumption is reduced; in the case of an EAF, electrode consumption is reduced; and productivity and yield are increased. Thus, there is a growing trend to charge HDRI to the melter or finisher, as opposed to DRI.

Typically, a DR plant is located in a large steelmaking complex that includes a meltshop. These steelmakers prefer to use HDRI directly from the DR plant. However, it is often not practical to locate the DR plant directly adjacent to the meltshop (i.e. within about 100 meters). Thus, the HDRI must be charged into the EAF using a hot transport vessel (HTV). In fact, some steelmakers simply prefer this procedure to gravity feeding HDRI into the EAF or using other types of mechanical hot conveyors. Existing HTV procedures are non-optimal for several reasons: 1) the feed rate of the HDRI charged into the EAF may not be accurately controlled; and 2) an EAF charge crane must be used to hold the HTV in position while charging the HDRI into the EAF, thereby limiting the annual volume of HDRI that may be charged into the EAF. Thus, existing HTV procedures are crude "crane-and-dump" procedures.

In all of these HTV procedures, the HTV utilized includes a relatively flat bottom, a plurality of trunions for lifting and turning the HTV, and a conical top including a port that serves as both an inlet and an outlet. Typically, the HTV is on rails. Other suitable transport procedures include mechanical hot conveyors, pneumatic hot conveyors, etc. One exemplary HTV is disclosed in commonly-assigned U.S. Pat. No. 6,214, 086 to Montague et al., issued on Apr. 10, 2001, and entitled "Direct Reduced Iron Discharge System and Method."

What are still needed in the art, however, are methods and apparatuses for charging HDRI from HTVs into a melter or finisher wherein the feed rate of the HDRI charged is known and controllable—by computer, for example; the feed rate of the HDRI charged may be substantially continuous; both heat loss and dust emissions are minimized; re-oxidation is minimized; existing meltshop equipment may be accommodated, such as EAF charge cranes, etc.; both existing and novel HTVs may be accommodated; and other materials may be charged, such as slag formers and reductants. Preferably, these methods and apparatuses would be robust and reliable, and would maximize the annual volume of HDRI that may be charged.

BRIEF SUMMARY OF THE INVENTION

In various exemplary embodiments, the present invention provides a method and apparatus for charging HDRI from HTVs into a melter or finisher wherein the feed rate of the HDRI charged is known and controllable—by computer, for example; the feed rate of the HDRI charged may be substantially continuous; both heat loss and dust emissions are minimized; re-oxidation is minimized; existing meltshop equipment may be accommodated, such as EAF charge cranes, etc.; both existing and novel HTVs may be accommodated; and other materials may be charged, such as slag formers and reductants. This method and apparatus is robust and reliable, and maximizes the annual volume of HDRI that may be charged.

In one exemplary embodiment, the present invention provides an apparatus for charging hot direct reduced iron or the like from hot transport vessels into a melter or finisher, including: a charging stand configured to receive and support a plurality of hot transport vessels; a feed device coupled to the charging stand, the feed device operable for sealingly engaging the plurality of hot transport vessels and transporting contents thereof from the plurality of hot transport vessels to a melter or finisher at a predetermined feed rate; and a control system operable for selectively varying the predetermined feed rate. The charging stand includes a plurality of bays configured to receive and support the plurality of hot transport vessels. The feed device includes a plurality of telescoping seals operable for sealingly engaging the plurality of hot transport vessels. The feed device is operable for transporting the contents of the hot transport vessels from the plurality of hot transport vessels to the melter or finisher at a substantially constant predetermined feed rate. Alternatively, the feed device is operable for transporting the contents of the hot transport vessels from the plurality of hot transport vessels to the melter or finisher at a substantially variable predetermined feed rate. The control system includes a programmable logic controller. The control system further includes a plurality of load cells. The control system is operable for selectively varying the predetermined feed rate responsive to the weight of one or more of the hot transport vessels and the contents thereof as measured by the plurality of load cells.

In another exemplary embodiment, the present invention provides a method for charging hot direct reduced iron or the like from hot transport vessels into a melter or finisher, including: providing a charging stand configured to receive and support a plurality of hot transport vessels; providing a feed device coupled to the charging stand, the feed device operable for sealingly engaging the plurality of hot transport vessels and transporting contents thereof from the plurality of hot transport vessels to a melter or finisher at a predetermined feed rate; and providing a control system operable for selectively varying the predetermined feed rate. Providing the charging stand includes providing a plurality of bays configured to receive and support the plurality of hot transport vessels. Providing the feed device includes providing a plurality of telescoping seals operable for sealingly engaging the plurality of hot transport vessels. The feed device is operable for transporting the contents of the hot transport vessels from the plurality of hot transport vessels to the melter or finisher at a substantially constant predetermined feed rate. Alternatively, the feed device is operable for transporting the contents of the hot transport vessels from the plurality of hot transport vessels to the melter or finisher at a substantially variable predetermined feed rate. Providing the control system includes providing a programmable logic controller. Providing the control system further includes providing a plurality of load cells. The control system is operable for selectively varying the predetermined feed rate responsive to the weight of one or more of the hot transport vessels and the contents thereof as measured by the plurality of load cells.

In a further exemplary embodiment, the present invention provides a method for charging hot direct reduced iron or the like from hot transport vessels into a melter or finisher, including: disposing a first hot transport vessel in a charging stand configured to receive and support a plurality of hot transport vessels; coupling the first hot transport vessel to a feed device operable for transporting the contents thereof to a melter or finisher; emptying the contents of the first hot transport vessel into the melter or finisher at a first predetermined feed rate using the feed device; disposing a second hot transport vessel in the charging stand configured to receive and support the plurality of hot transport vessels; coupling the second hot transport vessel to the feed device operable for transporting the contents thereof to the melter or finisher; and emptying the contents of the second hot transport vessel into the melter or finisher at a second predetermined feed rate using the feed device. Optionally, the second hot transport vessel is disposed in the charging stand while the first hot transport vessel is being emptied. Preferably, the first predetermined feed rate is determined based on the weight of the first hot transport vessel and the contents thereof. Likewise, the second predetermined feed rate is determined based on the weight of the second hot transport vessel and the contents thereof.

BRIEF DESCRIPTION OF THE DRAWINGS

The present invention is illustrated and described herein with reference to the various drawings, in which like reference numbers are used to refer to like method steps and/or apparatus components, as appropriate, and in which.

DETAILED DESCRIPTION OF THE INVENTION

In various exemplary embodiments, the present invention provides a method and apparatus for charging HDRI from HTVs into a melter or finisher. In the context of the present invention, the HDRI has a temperature of between about 400 and about 1100 degrees C. In general, the apparatus includes a charging stand including a plurality of bays for receiving and supporting a plurality of HTVs. As described in greater detail herein below, each HTV includes at least an outlet port. This outlet port is configured to engage an inlet port of one of the plurality of bays of the charging stand via a telescoping seal that provides a substantially air-tight seal. A feed device is provided that moves the HDRI disposed within the HTVs from the outlet port/inlet port interface to a melter or finisher, such as an EAF or the like. The charging stand also includes one or more load cells operable for weighing the HTVs and the HDRI disposed therein, such that a computer or other logic may be used to control the feed rate of the HDRI charged into the melter or finisher. Optionally, the charging stand further includes one or more flow stimulators, such as one or more vibrators or the like, operable for preventing bridging as the HTVs are emptied. Each of these basic apparatus components are addressed in greater detail herein below. Advantageously, the charging stand and plurality of HTVs may be located either inside a meltshop or just outside the meltshop wall. The method and apparatus for charging HDRI may also be used to charge other materials, such as slag formers and/or reductants.

Figure 1:
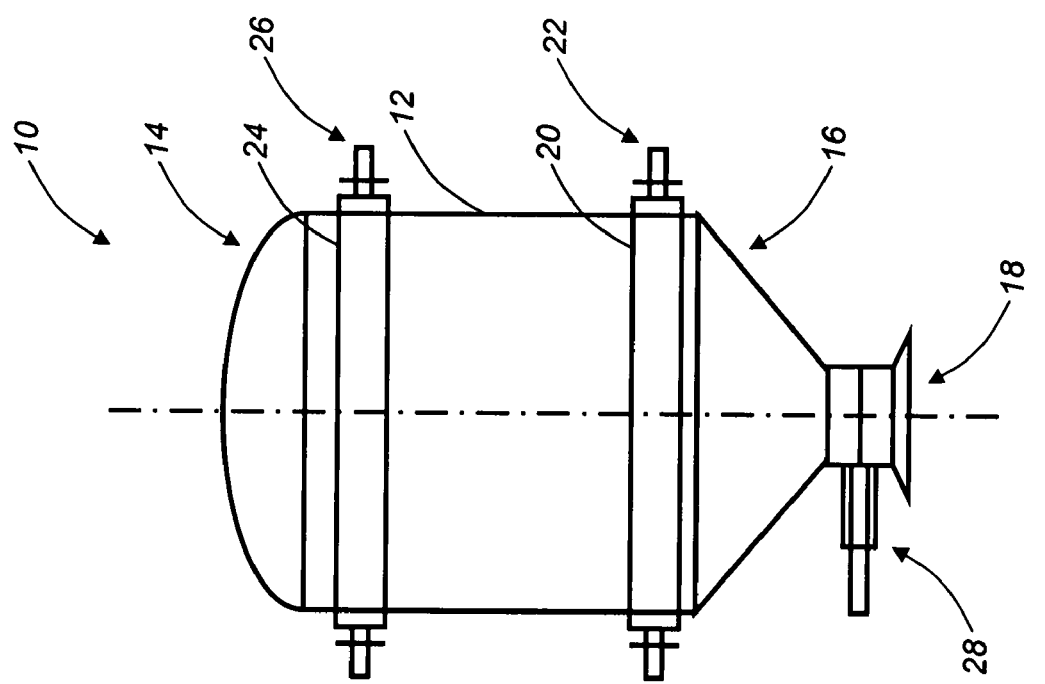
FIG. 1 is a side planar view illustrating one exemplary embodiment of an invertible HTV that may be used in conjunction with the method and apparatus for charging HDRI from HTVs into a melter or finisher of the present invention.

Referring to FIG. 1, in one exemplary embodiment, an invertible HTV 10 that may be used in conjunction with the method and apparatus for charging HDRI includes a substantially cylindrical drum 12 having a substantially dome-shaped end 14 and a substantially cone-shaped end 16. The substantially cone-shaped end 16 terminates in a substantially tubular port 18 that serves as both an inlet when the non-inverted HTV 10 is being filled with HDRI and an outlet when the inverted HTV 10 is being emptied. The substantially cylindrical drum 12 includes a lower collar 20 having an associated pair of trunions 22 and an upper collar 24 having an associated pair of trunions 26. The trunions 22 and 26 provide lower and upper pivotable handles for lifting and inverting the HTV 10. The feed rate of HDRI from HTVs into a melter or finisher has typically been a function of how slow/fast the HDRI flows through the substantially tubular port 18, and HDRI was typically charged into the melter or finisher in an increment of one full HTV. Advantageously, the HTV 10 of the present invention includes gate 28 disposed at or upstream from the substantially tubular port 18. This gate 28 controls the feed rate of HDRI from the HTV 10 into the melter or finisher, and keeps oxidizing air out of the substantially cylindrical drum 12. Because the feed rate of HDRI from the HTV 10 into the melter or finisher is independent of the diameter of the substantially tubular port 18, larger diameter substantially tubular ports may be employed, thereby reducing blockages caused by fused HDRI. Advantageously, the capacity of the HTV 10 may now be increased to the weight limit of the associated support structure, as the one full HTV increment has been eliminated.

Figure 2:
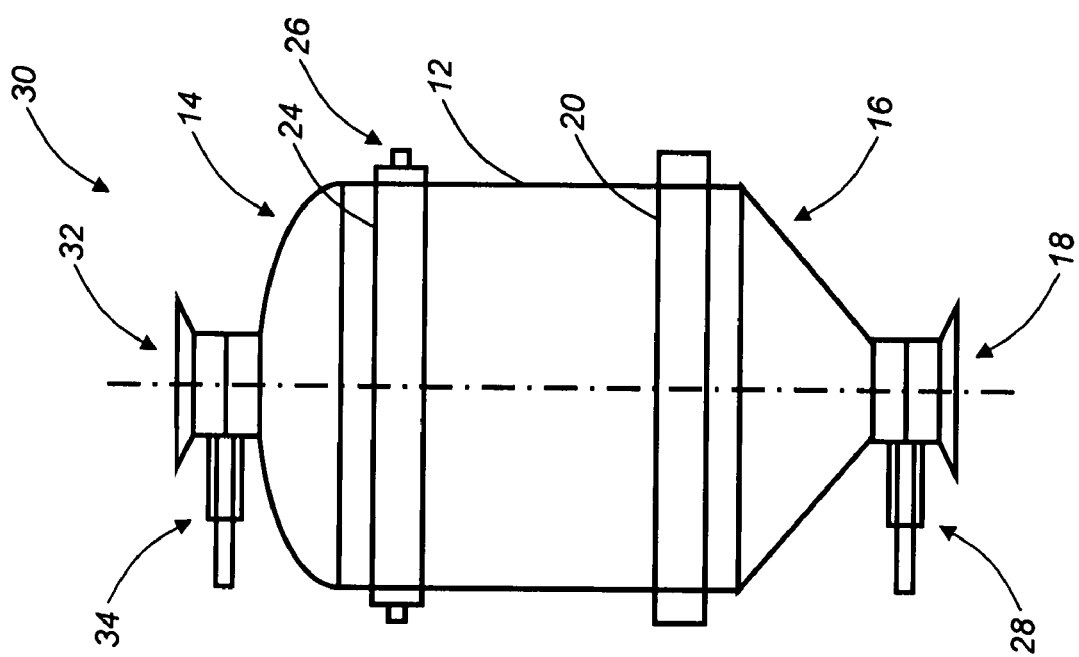
FIG. 2 is a side planar view illustrating another exemplary embodiment of a non-invertible HTV that may be used in conjunction with the method and apparatus for charging HDRI from HTVs into a melter or finisher of the present invention.

Referring to FIG. 2, in another exemplary embodiment, a non-invertible HTV 30 that may be used in conjunction with the method and apparatus for charging HDRI is similarly configured, except that the substantially dome-shaped end 14 of the substantially cylindrical drum 12 also terminates in a substantially tubular port 32 that serves as an inlet when the HTV 30 is being filled with HDRI. The substantially tubular port 18 associated with the substantially cone-shaped end 16 of the substantially cylindrical drum 12 serves an outlet when the HTV 30 is being emptied. Accordingly, the additional substantially tubular port 32 also includes a gate 34 that controls the feed rate of HDRI into the HTV 30, and keeps oxidizing air out of the substantially cylindrical drum 12. Multiple pairs of trunions 22 (FIG. 1) and 26 are not required, as the HTV 30 is not inverted.

Figure 3:
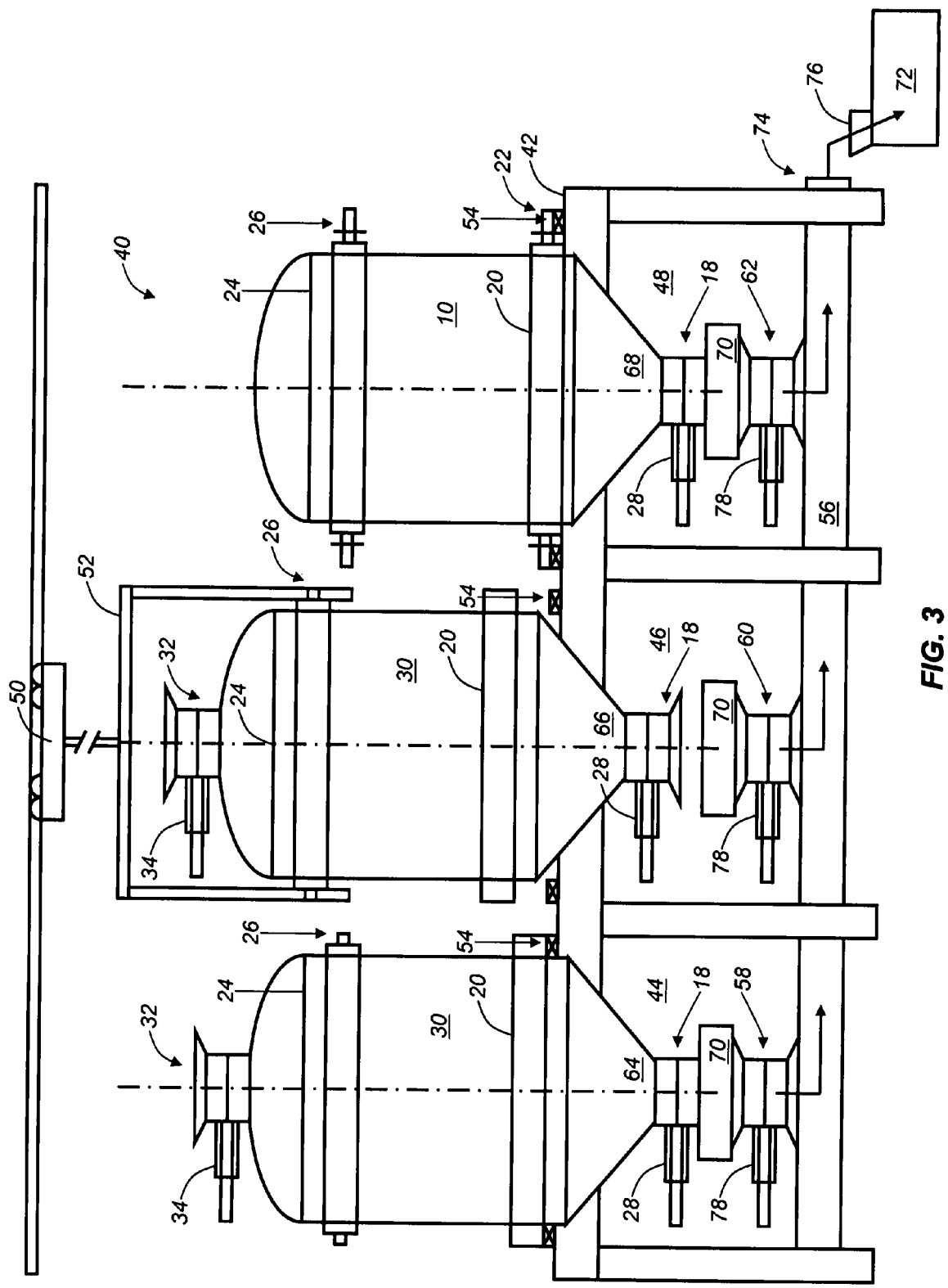
FIG. 3 is a side planar view illustrating one exemplary embodiment of the method and apparatus for charging HDRI from HTVs into a melter or finisher of the present invention.

Referring to FIG. 3, in one exemplary embodiment, the apparatus 40 for charging HDRI includes a charging stand 42 that is configured to receive and support a plurality of HTVs 10 and 30 in a plurality of bays 44, 46, and 48. In the exemplary embodiment illustrated, the plurality of bays 44, 46, and 48 are configured to receive and support a non-invertible HTV 30, another non-invertible HTV 30, and an invertible HTV 10, respectively. It will be readily apparent to those of ordinary skill in the art that other configurations are also possible. The plurality of HTVs 10 and 30 are positioned in the plurality of bays 44, 46, and 48 by an overhead crane 50 or the like including a yoke 52 that lifts and/or inverts the plurality of HTVs 10 and 30 by the associated trunions 22 and 26. The plurality of bays 44, 46, 48 may be outfitted with one or more flow stimulators (not illustrated), such as one or more vibrators or the like, operable for preventing bridging as the HTVs 10 and 30 are emptied. Preferably, the plurality of bays 44, 46, and 48 are outfitted with a plurality of load cells 54, selectively disposed between the charging stand 42 and the collars 20 and 24 of the HTVs 10 and 30, the trunions 22 and 26 of the HTVs 10 and 30 or the like. In general, the collars 20 and 24 or trunions 22 and 26 serve as the points of support for the HTVs 10 and 30. The plurality of load cells 54 are operable for weighing the HTVs 10 and 30 and the HDRI disposed therein, such that a computer or other logic (not illustrated) may be used to control the feed rate of the HDRI charged. The plurality of HTVs 10 and 30 charge the HDRI to a continuous or variable-rate feed device 56 through a plurality of inlets 58, 60, and 62, substantially corresponding to a plurality of outlets 64, 66, and 68 associated with the HTVs 10 and 30. A telescoping seal 70 is provided between each of the inlets 58, 60, and 62 and each of the outlets 64, 66, 68, providing a substantially air-tight seal, thereby minimizing air ingress into the apparatus 40, re-oxidation, and fugitive dust emissions. These telescoping seals 70 allow the HTVs 10 and 30 to be quickly and simply connected to/disconnected from the feed device 56 and, as they are telescoping, relatively little tension is formed by the connection. The feed device 56 regulates the flow of HDRI from each of the HTVs 10 and 30.

The telescoping seals 70 of the feed device 56 ensure that the feed device 56 is only partially load bearing, as the connection between an inlet 58, 60, and 62 on the feed device 56 and an outlet 64, 66, and 68 on the HTVs 10 and 30 adjusts in length such that substantially no force from the weight of the HTVs 10 and 30 is exerted on the feed device 56. However, once the HDRI is flowing into the inlet 58, 60, and 62, the weight of the HDRI contained within will be partially borne by the feed device 56, while the walls of the HTV 10 or 30 will bear the majority of the weight of the HDRI. The receiving and supporting bay 44, 46, or 48 supports the weight of an individual HTV 10 or 30 for that individual HTV 10 or 30, where each bay 44, 46, or 48 is fitted with a load cell 54 for determining the weight of the particular HTV 10 or 30 in the bay 44, 46, or 48. Typically, each HTV 10 or 30 has a known weight when the vessel is empty, and this is the tare weight, so that not only is the metered weight known, but so is the total available weight of HDRI, so that it can be calculated how frequently the HTVs 10 and 30 are to be changed out to maintain a continuous stream of charge material to the melter or finisher 72, and or whether or not there is sufficient charge material on hand for the melter or finisher 72. The total weight of the HDRI should be determined prior to opening the HTV 10 or 30, which would allow HDRI to flow into the feed device 56.

The charging stand 42 is located adjacent to the melter or finisher 72, well known those of ordinary skill in the art, and preferably substantially above the melter or finisher 72. It is desirable to utilize multiple HTVs 10 and 30 in order to prevent "down" time as an HTV 10 or 30 is moved to/from the charging stand 42. For example, when two HTVs 10 and 30 are utilized, one HTV 10 or 30 may be charged to the melter or finisher 72 at a controlled rate while another empty HTV 10 or 30 is removed from the charging stand 42 and replaced with a full HTV 10 or 30 using the overhead crane 50. In this manner, there is always a full HTV 10 or 30 in the charging stand 42 ready to be charged. In other words, a desirably continuous process is created.

The charging stand 42 may be located inside the meltshop or just outside the wall of the meltshop, for example. If the charging stand 42 is located inside the meltshop, then the meltshop charge crane may be used to handle the HTVs 10 and 30. If the charging stand 42 is located just outside the wall of the meltshop, then a separate crane may be installed and used to handle the HTVs 10 and 30. This may be desirable when the meltshop charge crane does not have adequate capacity to handle the heavy vessels, or when the meltshop charge crane is used frequently for other purposes and is not available when needed to handle the heavy vessels.

It is also desirable to locate the charging stand 42 at an elevation that allows the HDRI to flow from the HTVs 10 and 30, through the feed device 56, and into the melter or finisher 72 without having to significantly re-elevate the HDRI along its path of travel. In this case, a wider selection of feed devices may be used which include, but are not limited to, vertical screw-feeders, horizontal screw-feeders, rotary feeders, horizontal differential oscillating conveyors, tube conveyors, vibrating pan conveyors, and wiper bars. Conversely, if the discharge chute 74 of the feed device 56 is significantly below the feed inlet 76 of the melter or finisher 72, then a bucket-type conveyor that is capable of increasing elevation and controlling the feed rate may be used.

Preferably, the plurality of HTVs 10 and 30 each have the capacity to hold an amount of HDRI needed for one heat cycle. As described above, the HTVs 10 and 30 may have a separate inlet 32 on dome 14 and outlet 18 on cone 16 (HTV 30 illustrated in FIG. 2), or may have a common inlet/outlet 18 on cone 16 (HTV 10 illustrated in FIG. 1). In either case, it is important that the HTVs 10 and 30 minimize air ingress to the extent practicable. This is somewhat easier to accomplish when there is a common inlet/outlet 18, however an HTV 10 must be inverted prior to being emptied, which necessitates additional handling. Each HTV 10 and 30 may undergo a low pressure, low velocity purge using non-oxidizing gas, such as nitrogen, in order to ensure that air is occluded. As described above, slide gates 28 and 34 are provided on the inlet 18 or 32 and the outlet 18 of each HTV 10 and 30 to selectively stop material flow and to minimize air ingress. A slide gate 78 is also provided between the telescoping seal 70 associated with each bay 44, 46, and 48 of the charging stand 42 and the feed device 56. Thus, the feed device 56 used to control the feed rate of the HDRI to the melter or finisher 72 is capable of handling high-temperature HDRI in a substantially sealed environment, minimizing re-oxidation of the HDRI, minimizing fugitive dust emissions, and minimizing temperature loss of the HDRI.

Again, examples of feed devices that may be used in conjunction with the apparatus 40 of the present invention include: screw feeders (either horizontal or vertical, depending on height limitations associated with the general arrangement); rotary feeders; horizontal differential oscillating conveyors; tube conveyors; vibrating pan conveyors; apron conveyors; bucket conveyors; and wiper bars. Auger-type screw feeders are particularly accurate, wherein the rate that the screw turns is controlled by a computerized controller (not illustrated), such as a programmable logic controller (PLC) that adjusts the screw speed to achieve a change in weight per unit of time (i.e. a metered rate of charging), wherein the PLC monitors multiple load cells 54 in order to achieve the desired metered feed rate. The PLC monitors the change in weight through a data line (not illustrated) in electrical communication with the load cells 54, and controls the speed of the feed device 56 through a channel (not illustrated).

Examples of melters that may receive HDRI are EAFs, electric ironmaking furnaces, oxygen-based chemical melters (CDMs), etc. An example of a finisher is a KwikSteel™ or other device intended to remove gangue from the HDRI before making steel.

Although the present invention has been illustrated and described with reference to preferred embodiments and specific examples thereof herein, it will be readily apparent to those of ordinary skill in the art that other embodiments and examples may perform similar functions and/or achieve like results. All such equivalent embodiments and examples are within the scope and spirit of the present invention, are contemplated thereby, and are intended to be covered by the following claims.

What is claimed is:

1. An apparatus for charging hot direct reduced iron or the like from hot transport vessels into a melter or finisher, comprising:
    a charging stand configured to simultaneously receive and support a plurality of hot transport vessels;
    a feed device coupled to the charging stand, the feed device operable for simultaneously sealingly engaging the plurality of hot transport vessels and transporting contents thereof from the plurality of hot transport vessels to a melter or finisher at a predetermined feed rate; and
    a control system comprising a programmable logic controller and a plurality of load cells operable for selectively varying the predetermined feed rate;
    wherein the control system is operable for selectively varying the predetermined feed rate responsive to the weight of one or more of the hot transport vessels and the contents thereof as measured by the plurality of load cells; and
    wherein the control system is operable for directing the replacement of one or more of the plurality of hot transport vessels when the one or more of the plurality of hot transport vessels is substantially empty as measured by the plurality of load cells such that the apparatus is operated to charge hot direct reduced iron substantially continuously over a predetermined period of time.

2. The apparatus of claim 1, wherein the charging stand comprises a plurality of bays configured to receive and support the plurality of hot transport vessels.

3. The apparatus of claim 1, wherein the feed device comprises a plurality of telescoping seals operable for sealingly engaging the plurality of hot transport vessels.

4. The apparatus of claim 1, wherein the feed device is operable for transporting the contents of the hot transport vessels from the plurality of hot transport vessels to the melter or finisher at a substantially constant predetermined feed rate.

5. The apparatus of claim 1, wherein the feed device is operable for transporting the contents of the hot transport vessels from the plurality of hot transport vessels to the melter or finisher at a substantially variable predetermined feed rate.

* * * * *